July 12, 1955 G. VON ELM 2,712,926
WATER DRIVEN OR HYDRAULIC CREAM WHIPPING DEVICE
Filed Sept. 28, 1953
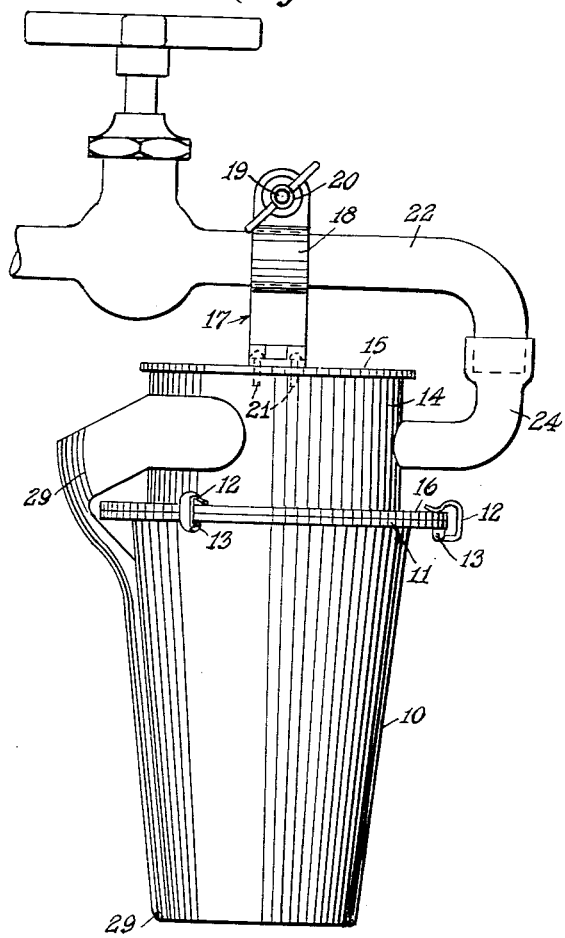
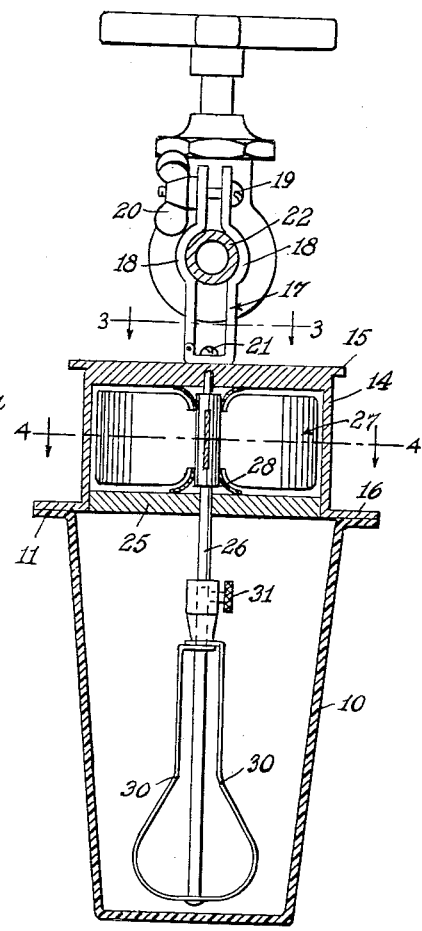
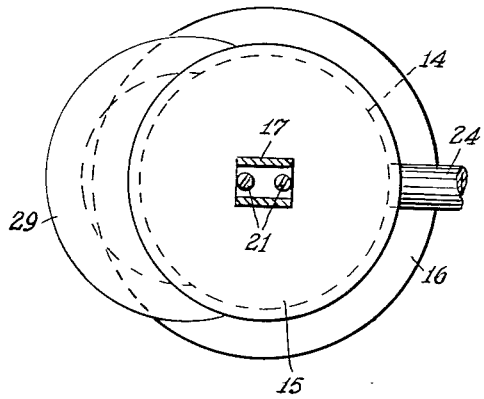
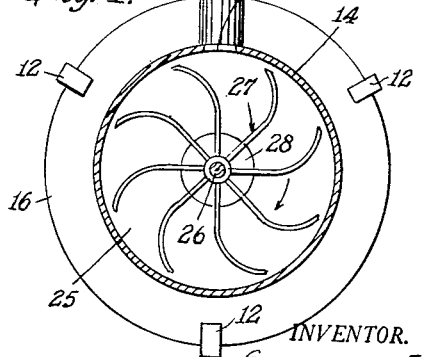
INVENTOR.
GUNTER VON ELM
BY Manning Chung
ATTORNEY

United States Patent Office 2,712,926
Patented July 12, 1955

2,712,926

WATER DRIVEN OR HYDRAULIC CREAM WHIPPING DEVICE

Gunter Von Elm, Winnipeg, Manitoba, Canada

Application September 28, 1953, Serial No. 382,794

2 Claims. (Cl. 259—103)

This invention relates to water driven or hydraulic cream whipping devices.

It is an object of the present invention to provide a water driven cream whipping device which is superior to hand operated whipping devices in the economy of time and effort and which is lower in cost, both initial and operating, than electrically operated mixers.

It is another object of the present invention to provide a whipping device of the above type which will keep the food being whipped in a cool condition.

Other objects of the present invention are to provide a hydraulic cream whipping device bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Fig. 1 is a side elevational view of a cream whipping device embodying the features of the present invention and shown in operative use upon a faucet;

Fig. 2 is a vertical sectional view thereof;

Fig. 3 is a top plan view looking along the line 3—3 of Fig. 2; and

Fig. 4 is a transverse sectional view taken along the line 4—4 of Fig. 2.

The invention consists essentially of a device for use in the home which will whip, beat or mix cream, eggs and other foods and which is operated by the action of water under ordinary domestic pressure by means of attachment of the device to an ordinary kitchen cold water faucet.

Referring now to the drawing, the device includes a cup 10 of plastic or other suitable material integrally formed at its upper end with a circular flange 11, the undersurface of flange 11 pivotally mounts a plurality of radially spaced resilient clamps 12 by means of hinges 13. A cylindrical housing 14 is provided having a top wall 15 and an open bottom, the housing 14 around the open bottom thereof being integrally formed with a circular flange 16 adapted to coincide with flange 11 and to be secured thereto by means of the clamps 12 when snapped into their upper position. Thus, the housing 14 is releasably secured to the cup 10.

A U-shaped clamp 17 having a circular central portion 18 and a pair of spaced upper ends connected by a screw 19 and a wing nut 20 is secured to the top wall 15 by means of screws 21. The central portion 18 is adapted to receive therewithin the faucet 22 of conventional design, thus mounting the device below the latter as shown when the wing nut 20 is tightened. The housing 14 is provided with an inlet opening 23 (Fig. 4) within which is secured one end of a flexible tubing 24, the other end of flexible tubing 24 being forced onto the faucet outlet 22.

The bottom of housing 14 is closed by a circular bottom wall 25 suitably secured in position, the casing 14 and bottom wall 25 being preferably formed of plastic along with the cup 10. A vertical shaft 26 is rotatably mounted in the top wall 15 and passes downwardly through a suitable opening provided in the bottom wall 25, the shaft 26 extending downwardly to terminate near the bottom of cup 10. A water wheel or turbine 27 is keyed onto the shaft 26 within housing 14, a rubber washer 28 being provided at the bottom of the turbine 27 to prevent liquid from passing downwardly through the joint between shaft 26 and bottom wall 25. It will be noted from Fig. 4 that the blades of turbine 27 are substantially S-shaped in cross section whereby to rotate the turbine under the action of water discharge of the inlet 23. An arcuate discharge opening is provided in the side of casing 14 remote from inlet opening 23, a shield or hood 29 being secured to the casing 14 surrounding the outlet opening and being adapted to convey the discharge liquid down on to the cup 10 whereby to cool the contents of the latter during operation of the device. The small set of wings 30 are secured to the shaft 26 by means of a screw 31 and a screw 32 (Fig. 2). Thus, the wings 10 form an agitator or propeller for the contents of cup 10.

In operation, the container 10 is detached and filled with the cream, eggs or other food desired to be whipped, beaten or mixed, the container then being clamped in place on the underside of the housing 14 by means of clamps 12. The whole apparatus is then clamped into place upon portion 22 with the free end of hose 24 connected to the cold water tap. As the water emerges from the faucet 22 under pressure, it will enter the casing 14 through hose 24 and rotating the water turbine 27 at high speed. This will in turn rotate the shaft 26 and wings 30, and agitating or whipping the food contained therein. The water overflows through the hood 29 and runs over the side of the container 10, thus cooling the contents thereof.

While various changes may be made in the detail construction, it shall be understood that such changes shall be within the spirit and scoop of the present invention, as defined by the appended claims.

What is claimed as new is:

1. A water driven whipping device comprising a closed substantially cylindrical casing, a shaft rotatably mounted at the center of said casing and extending downwardly from the bottom thereof a substantial distance, whipping means secured to the bottom of said shaft, a container adapted to surround said shaft below said casing, said casing being formed with a circular flange at the bottom thereof, said container being formed with a circular flange at the top thereof, releasable means for clamping said flanges together in overlapping relation, a water turbine keyed onto the upper end of said shaft within said casing, said casing having an inlet opening, means for connecting said inlet opening to a source of cold water, said casing having an outlet opposite said inlet, and an arcuate hood secured to said casing on the outside thereof and surrounding said opening, said hood being adapted to conduct the discharged liquid downwardly onto the outside of said container over substantially the length thereof.

2. A device according to claim 1, including a substantially U-shaped clamp secured at its central portion to the top of said casing, said clamp having a circular central portion adapted to receive a household faucet or the like therethrough, and releasable tightening means at the upper ends of said clamp.

References Cited in the file of this patent

UNITED STATES PATENTS

| | | |
|---|---|---|
| 1,082,513 | Gaines | Dec. 30, 1913 |
| 1,623,754 | Ritter | Apr. 5, 1927 |
| 1,740,709 | Parker et al. | Dec. 24, 1929 |
| 2,189,146 | Little | Feb. 6, 1940 |

FOREIGN PATENTS

| | | |
|---|---|---|
| 80,399 | Switzerland | Mar. 1, 1919 |